(12) United States Patent
Effros et al.

(10) Patent No.: US 11,070,484 B2
(45) Date of Patent: Jul. 20, 2021

(54) METHOD AND APPARATUS FOR IMPROVING COMMUNICATION PERFORMANCE THROUGH NETWORK CODING

(71) Applicants: Michelle Effros, Pasadena, CA (US); Tracey Ho, Pasadena, CA (US)

(72) Inventors: Michelle Effros, Pasadena, CA (US); Tracey Ho, Pasadena, CA (US)

(73) Assignee: CODE ON NETWORK CODING LLC, Cambridge, MA (US)

(*) Notice: Subject to any disclaimer, the term of this patent is extended or adjusted under 35 U.S.C. 154(b) by 161 days.

(21) Appl. No.: 14/211,566

(22) Filed: Mar. 14, 2014

(65) Prior Publication Data

US 2014/0269289 A1  Sep. 18, 2014

Related U.S. Application Data

(60) Provisional application No. 61/788,174, filed on Mar. 15, 2013.

(51) Int. Cl.
*H04L 12/811* (2013.01)
*H04L 29/06* (2006.01)
*H04L 12/801* (2013.01)

(52) U.S. Cl.
CPC ............ *H04L 47/38* (2013.01); *H04L 47/18* (2013.01); *H04L 47/193* (2013.01); *H04L 69/02* (2013.01); *H04L 69/14* (2013.01); *H04L 69/164* (2013.01); *H04L 69/165* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 6,035,427 A * | 3/2000 | Kweon | ............ | H03M 13/2764 714/702 |
| 7,161,994 B2 * | 1/2007 | Shah | ............ | H03M 13/00 375/341 |
| 7,453,801 B2 * | 11/2008 | Taneja | ............ | H04L 47/805 370/230 |

(Continued)

OTHER PUBLICATIONS

International Search Report PCT/US14/28349 dated Aug. 7, 2014, 7 pages.

(Continued)

*Primary Examiner* — Ayaz R Sheikh
*Assistant Examiner* — Faiyazkhan Ghafoerkhan
(74) *Attorney, Agent, or Firm* — Anderson Gorecki LLP

(57) ABSTRACT

A method, apparatus and computer program product providing improved communication performance through network coding is presented. Coded packets are formed at a source node, the coded packets comprising a combination of original packets at the source node. The coded packets are transmitted to at least one destination node using an unreliable protocol. A reconstruction is formed based on received coded packets at the destination node, wherein when a number of received coded packets are equal to the number of transmitted coded packets the forming a reconstruction comprises forming a complete reconstruction and wherein when the number of received coded packets is less than the number of transmitted coded packets the reconstruction comprises forming a best attempt at reconstruction.

22 Claims, 10 Drawing Sheets

(56) References Cited

U.S. PATENT DOCUMENTS

| | | | |
|---|---|---|---|
| 8,990,901 B2* | 3/2015 | Aravindakshan | H04L 69/164 726/4 |
| 9,137,338 B2* | 9/2015 | Schmieder | H04L 69/16 |
| 2002/0066013 A1* | 5/2002 | Relander | H04W 56/009 713/151 |
| 2004/0013089 A1* | 1/2004 | Taneja | H04L 47/41 370/235 |
| 2005/0100035 A1* | 5/2005 | Chiou | H04L 45/24 370/412 |
| 2006/0209955 A1* | 9/2006 | Florencio | G10L 19/0212 375/240.12 |
| 2007/0011343 A1* | 1/2007 | Davis | H04L 47/38 709/231 |
| 2009/0144597 A1* | 6/2009 | Xue | H04L 1/1887 714/748 |
| 2009/0252146 A1* | 10/2009 | Luo | H03M 13/2906 370/351 |
| 2010/0046371 A1* | 2/2010 | Sundararajan | H04L 1/1874 370/235 |
| 2010/0054164 A1* | 3/2010 | Lucani | H04L 1/1671 370/294 |
| 2010/0125455 A1* | 5/2010 | Wang | G10L 19/08 704/219 |
| 2010/0214970 A1* | 8/2010 | Brunner | H04L 12/1868 370/312 |
| 2010/0260189 A1* | 10/2010 | Ansari | H04L 67/104 370/400 |
| 2011/0176408 A1* | 7/2011 | Sun | H04L 1/1861 370/216 |
| 2011/0185068 A1* | 7/2011 | Schmieder | H04L 69/24 709/227 |
| 2011/0219287 A1* | 9/2011 | Srinivas | H03M 13/07 714/781 |
| 2012/0054583 A1* | 3/2012 | Park | H03M 13/6306 714/776 |
| 2012/0128009 A1 | 5/2012 | Yang et al. | |
| 2012/0314655 A1* | 12/2012 | Xue | H04L 1/0076 370/328 |
| 2013/0051388 A1* | 2/2013 | Pantelidou | H04L 1/0076 370/390 |
| 2013/0058276 A1* | 3/2013 | Somasundaram | H04L 1/0076 370/328 |
| 2013/0114481 A1* | 5/2013 | Kim | H04W 28/02 370/310 |
| 2013/0195106 A1* | 8/2013 | Calmon | H04L 69/14 370/389 |
| 2013/0229908 A1* | 9/2013 | Driessen | H04L 1/0045 370/216 |
| 2014/0269289 A1* | 9/2014 | Effros | H04L 47/38 370/231 |
| 2015/0095739 A1* | 4/2015 | Zhovnirnovsky | H04L 69/16 714/759 |
| 2015/0100858 A1* | 4/2015 | Zhovnirnovsky | H04L 1/0009 714/776 |
| 2017/0237652 A1* | 8/2017 | Calmon | H04L 45/24 370/315 |

OTHER PUBLICATIONS

Communication pursuant to Article 94(3) EPC in Applicant No. 14 762 953.9-1213 dated May 24, 2018.

* cited by examiner

Multi-Path TCP

Coded TCP

Coded UDP

MULTI-PATH Coded UDP

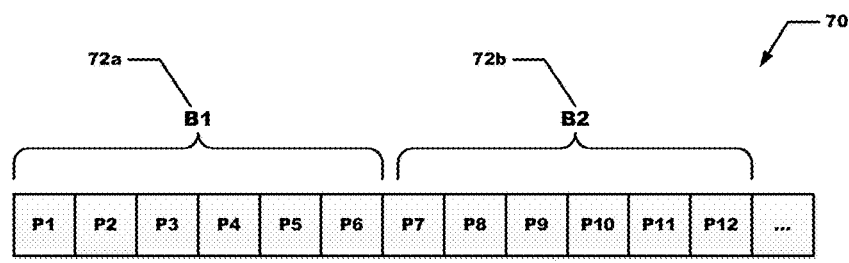
*FIGURE 4A*
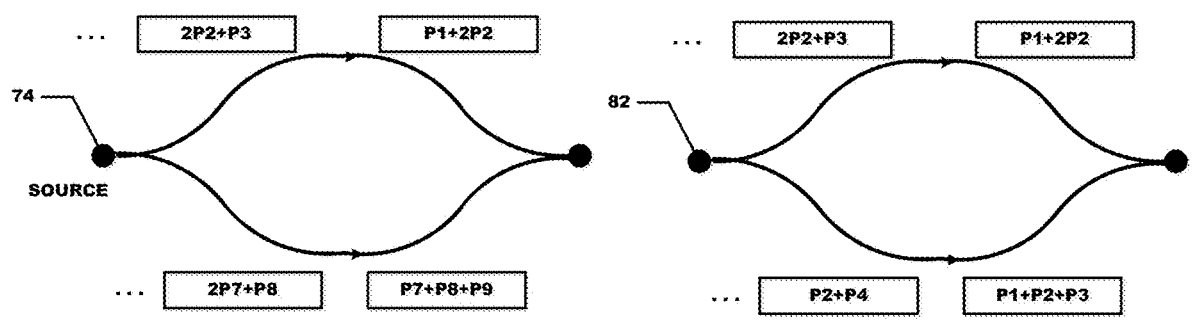
*FIGURE 4B*  *FIGURE 4C*

METHOD AND APPARATUS FOR IMPROVING COMMUNICATION PERFORMANCE THROUGH NETWORK CODING

CROSS REFERENCE TO RELATED APPLICATIONS

The present application claims the benefit of U.S. Provisional Patent Application No. 61/788,174 filed on Mar. 15, 2013, which is incorporated herein by reference in its entirety.

BACKGROUND

As is known in the art, a variety of protocols are available for communicating over networks. For example, the internet protocol suite includes communication protocols at many levels of the network protocol stack, including the transport layer (e.g., the Transmission Control Protocol (TCP), User Datagram Protocol (UDP), Datagram Congestion Protocol (DCCP), Stream Control Protocol (SCTP), Multi-Path Transmission Control Protocol (MPTCP), and Resource Reservation Protocol (RSVP)), the application layer (e.g., the Session Initiation Protocol (SIP), Real-Time Transport Protocol (RTP), Real Time Streaming Protocol (RSTP), SOCKet Secure (SOCKS), the link layer (e.g., the Ethernet, DSL, and ISDN protocols), the internet layer (e.g., the Internet Control Message Protocol (ICMP), Internet Group Management Protocol (IGMP)), and many others. A variety of other protocols are designed for specialized use. For example, the Time-Triggered Protocol (TTP) is a protocol used for communication networks within control system architectures that establishes fault-tolerant clock synchronization without a central time server.

Some protocols treat the delivery of information of direct use to system users. Examples of such data types include voice, video, audio, text, scene and action updates from online games, and market or financial data. Other protocols treat the delivery of information concerning the status and control of network resources. Examples of such data types include acknowledgments, stream control, routing, and resource reservation data.

Protocols can be classified as either reliable protocols or unreliable protocols. Nodes running reliable protocols will work together to verify the transmission of data to ensure accuracy and integrity of the data. A reliable system will set up a connection and verify that: all data transmitted is controlled in an orderly fashion, is received in the correct order and is intact. Reliable protocols work best over physical medium that loses data, and is prone to errors. The error correction, ordering and verification mechanisms require overhead in the data packets and increase the total amount of bandwidth required to transmit data. Transmission Control Protocol (TCP) is a typical reliable protocol.

Unreliable protocols make no effort to set up a connection, they don't check to see if the data was received and usually don't make any provisions for recovering from errors or lost data. Unreliable protocols work best over physical medium with low loss and low error rates. User Datagram Protocol (UDP) is an example of an unreliable protocol. UDP makes no provisions for verifying whether data arrived or is intact. However, UDP adds a minimum of overhead when compared to TCP and is thus much faster for data transfers over high quality physical links that are high speed and exhibit little or no errors in communication.

Communication performance can be measured in many ways. Examples include throughput, service response time, packet loss rates, network congestion, quality of service, delay, reliability, security, preservation of packet arrival order, and absence of packet duplication. The measures of greatest importance vary from one application to another. For example, voice transmission, streaming media, market transactions, and multi-user online gaming data are often very sensitive to delay. Data from internet applications such as file transfer, email, and web browsing may be less sensitive to delay but more sensitive to reliable delivery.

In many scenarios, tight constraints on one performance measure have a cost in other measures. For example, in many network implementations, decreasing latency or delay may increase packet loss rates or decrease throughput. Each protocol design incorporates a variety of protocol design choices that impact communication performance. For example, TCP is designed to achieve reliable, in-order information delivery. In TCP, reliability is achieved through acknowledgment of received packets, retransmission of lost packets, and rate control. Acknowledgments (ACKs) are the feedback information sent from each receiver to the transmitter. Acknowledgments detail which packets of information have been received. Packets are acknowledged only if they arrive in order, so packets that are lost or received out of order require retransmission. Since lost packets are understood by the transmitter to represent a sign of network congestion, lost packets also trigger transmission rate reduction to mitigate network congestion. Using these techniques, TCP achieves reliable, in-order data transmission at the cost of lower throughput due to retransmissions and rate reductions, increased network traffic to carry data retransmissions and acknowledgments, and increased delay since each subsequent packet is delayed by retransmission of earlier packets in a data stream.

UDP is a minimal protocol mechanism that uses no acknowledgments and does not provide protection against duplicate, out-of-order, or lost packets. By removing reliability constraints, UDP may achieve lower delay and increased throughput when compared to alternatives like TCP, though precisely which data is delivered and in what order is no longer guaranteed. UDP may be attractive for applications such as streaming media (voice, audio, and video) and gaming systems, where delay constraints predominate and dropping packets is sometimes preferable to receiving them beyond some acceptable delay. When using UDP, duplicate, out-of-order, and lost packets are handled by the applications. Some applications handle these issues by implementing at the application layer acknowledgments or other mechanisms to increase reliability. Other applications handle these issues by defining mechanisms to continue operating in the face of lost packets. For example, an MPEG-coded video application may use high numbers of Intra-frames (I-frames) so that new frames of a video can be decoded independently, without reference to potentially missing prior frames. Since UDP reduces network controls traffic (e.g., the traffic that results from acknowledgments), UDP is also potentially useful for large broadcast applications, where acknowledgment traffic from a large number of receivers can cause significant network congestion.

A variety of new protocols such as the TCP with Network Coding Protocol (TCP/NC) described in U.S. Pat. No. 8,130,776, Code Transmission Protocol (CTCP) described in U.S. patent application Ser. No. 13/291,310, and Multipath TCP with Network Coding Protocol (MPTCP/NC) described in U.S. patent application Ser. No. 61/592,746 combine prior protocol strategies (e.g., TCP) with network coding. The use of network coding can improve performance as measured, for example, by throughput and delay. These protocols maintain the requirement for reliable information delivery status imposed by TCP. Reliability is achieved in these protocols either at the transport layers (as with TCP) or by implementation of similar mechanisms at other network layers (for example, by tunneling a TCP connection through UDP) or by transmission of novel coded packets until all packets can be decoded at the receiver. Reliability is critical to the operation of existing coded transport protocols like TCP/NC, CTCP, and MTCP/NC as it may be impossible to extract some or all of the data from the coded data packets unless a sufficient number of coded packets are received.

In applications where mechanisms used to increase reliability cause too much degradation in performance (e.g., too much delay, too much network congestion, or too low of a throughput) or where the resources required to implement those mechanism are not available (e.g., networks without feedback), it would be desirable to provide one or more methods to enable the performance benefits of network coding without the reliability guarantees of protocols like TCP, TCP/NC, CTCP, and MTCP/NC.

SUMMARY

In accordance with the concepts, systems, and techniques herein described are several methods to facilitate the implementation of a system and technique which uses coding and is suitable for use as a communication protocol. In some embodiments, levels of reliability can be tuned to network conditions (e.g., packet loss rates and round trip times), data characteristics (e.g., delay-constrained or urgent), and demand scenarios (e.g., number and type of receivers.) In some embodiments, feedback is not employed. In some embodiments, limited feedback is employed. In some embodiments, the method is a single-path protocol. In some embodiments, the method is a multi-path protocol. In one embodiment, the protocol is a single-path protocol that can emulate UDP and provide a more effective service. When implemented at the transport layer to emulate UDP, the protocol technique described herein is referred to as Coded User Datagram Protocol (CUDP). When implemented at the transport layer to emulate UDP using multiple paths, the protocol technique described herein is referred to as Multipath Coded User Datagram Protocol (MCUDP).

It should be appreciated that even though the concepts, systems, and techniques are sometimes described herein in the context of a transport protocol, the same concepts, systems, and techniques may also be implemented in an application layer, in a link layer, or in a network in which no protocol stack is enforced. For example, the protocol may be implemented in an application layer when a protocol that is incompatible with UDP (e.g., SSH) is in place, or in a link layer.

In accordance with the concepts, systems, and techniques described herein, a communication protocol includes a method of delivering data (including but not limited to voice, image, video, purchase or sales requests, and distributed multi-player game updates) from one or more source nodes to one or more destination nodes sometimes through one or more intermediate nodes by forming coded packets as a linear or nonlinear combination of original packets at the sources and delivering either the same coded data packets or further coded packets of that data to the destinations over one or more network paths. The coded packets represent the data to be transmitted. In some embodiments, the coded data is delivered to the destinations without further coding of the packets. In other embodiments, the coded data is further coded by intermediate nodes between the source and the destination.

With this particular arrangement a coding approach for a flexible network communication protocol that increases throughput and robustness and decreases delay with a tunable level of reliability is provided. The concepts, systems, and techniques described herein take advantage of multiple paths, interfaces, mediums, servers, and storage locations where available in a network. By using coding, it is possible to eliminate the need to track packet identities, and, hence, it is possible to reduce or even eliminate coordination overhead associated with many conventional congestion protocols. This allows one to provide service that is robust against local failures. The coded protocol and related techniques allow quick response to congestion and failures by load balancing over different network resources.

In some embodiments, the communication protocol further includes providing feedback from the destinations to the sources and, based upon the feedback from the destination, modifying the coding parameters. In some embodiments, large quantities of feedback are employed (e.g., individual packet acknowledgments). In other embodiments, limited feedback is employed (e.g., occasional reports of the number of packets received along a given sub-flow).

In some embodiments by using feedback from the destination to the source, the number of packets combined in each coding packet is modified according to the observed end-to-end delay and packet loss rates. Increasing the number of packets combined can increase reliability and decrease the total number of packets required; this is acceptable when the end-to-end delay is lower than the delay constraint or the packet loss rate is small.

In some embodiments where feedback informs the transmitter of a high packet loss rate, the number of packets combined in each coded packet is decreased. This allows reliable decoding of some packets with a smaller collection of received packets.

In some embodiments, different coded packets delivered until some designated portion of the data (e.g., a designated high priority portion of the data) are reliably received.

In some embodiments, coding at intermediate nodes of the network is used to reduce the computational load at the receivers. In some embodiments, coding at intermediate nodes of the network is used to reduce rate decreases from congestion avoidance in TCP. For example, in some embodiments, intermediate nodes adjacent to the last hop decode data and send acknowledgments for the received data to the transmitter; these intermediate nodes retransmit the data over the last hop uncoded. In these embodiments, packet losses due to network congestion can be distinguished from packet losses due to other factors such as path loss in a last hop, and congestion avoidance is not triggered by losses unrelated to network congestion. By not enforcing complete reliability, it is possible to operate efficiently even when the network resources required to obtain full reliability are not available and to deliver a portion of the data reliably, with low delay and lower overhead.

In some embodiments, the method involves forming coded packets by at the one source node, the coded packets comprising a combination of original packets at said at least one source node. The method further includes transmitting the coded packets to at least one destination node using an unreliable protocol. Additionally the method includes forming a reconstruction based on received coded packets at the destination node, wherein when a number of received coded packets are equal to the number of transmitted coded packets the forming a reconstruction comprises forming a complete reconstruction and wherein when the number of received coded packets is less than the number of transmitted coded packets the reconstruction comprises forming a best attempt at reconstruction.

The concepts, systems, and techniques described herein take advantage of multiple paths, interfaces, mediums, servers, and storage locations when those resources are available in a network. The coded protocol and related techniques allow quick response to congestion by load balancing over different network resources where available, modifying feedback rates where used, and changing coding operations where useful.

In some embodiments, the transport protocol technique includes providing feedback from one or more destination nodes to one or more source nodes and then the forming a new linear or nonlinear combination of packets at the source node and delivering the new combination of packets from the source nodes to the destination nodes.

In accordance with a further aspect of the concepts, systems, and techniques herein, in some embodiments a transport protocol based on network coding for data delivery includes a method of transmitting data from a source node to a destination node by forming a linear combination of packets at the source node. The linear combinations of packets (coded packets) represent the data to be transmitted. In some embodiments, the same linear combination of packets formed at the source node is delivered to the destination node over one or more network paths. In other embodiments, further coding is done at intermediate nodes of the network.

In one embodiment, a media file is divided into disjoint subsets of packets, and the transport protocol described herein is tailored to meet delay requirements of media streaming applications. Also described are different coding strategies for subset delivery based upon an urgency level of each subset. In one embodiment, a method and system based on network coding for design and implementation of a transport protocol in a network is described. The transport protocol takes advantage of multiple paths, interfaces, and servers available in the network. This allows one to provide a reliable service that trades off performance criteria (e.g., reliability, complexity, power consumption, delay) to satisfy quality of service (QoS) requirements of delay sensitive applications such as video streaming. Even under limited feedback, the transport protocol described herein allows quick response to congestion by load balancing over different network resources. The transport protocol and techniques described herein also enable soft vertical hand-over across heterogeneous networks.

In one embodiment, the transport protocol technique further includes providing feedback from the destination node to the source node and then forming a new linear combination of packets at the source node and delivering the new combination of packets from the source node to the destination node.

In one embodiment, the process is repeated until all of some portion of the original data can be decoded at one or more high priority client nodes.

In one embodiment, the source is a server and the destination is a client.

In one embodiment, the plurality of packets represent a file.

In one embodiment, the technique is implemented in one of: a link layer, a transport layer, an application layer, and a physical layer.

In one embodiment, forming a combination of packets includes generating a linear combination of packets at random or deterministically.

In some embodiments, a coded packet comprises a combination of all packets that make up the data file. In other embodiments, a coded packet comprises a combination of a subset of the packets that make up the data file.

In some embodiments, forming a linear combination of packets is done by forming a random linear combination of a subset of packets and in other embodiment, forming a linear combination of packets is done by choosing the coding coefficients deterministically. The subset of packets chosen to form linear combinations can be obtained in a deterministic or probabilistic fashion.

In some embodiments, the coefficients in the linear combination are embedded within a payload.

In accordance with a still further aspect of the concepts, systems, and techniques described herein, it should be appreciated that there exist scenarios in which a client-device (e.g., a wireless mobile device) may not be able to connect simultaneously to two access points. This could be due to hardware constraints, such as the client device having a single WiFi card thereby limiting the client-device to be associated with a single WiFi access point at any given point in time. This may pose a challenge to soft-handoff between two access points.

Thus, the coded protocol concepts, systems and/or techniques described may be used to form a method of soft-handoff, where there is an intermediate means of access available between two access points. In one embodiment, first and second different access points use first and second WiFi networks, and an intermediate means of access corresponds to a 3G or a 4G network. Even though the client-device may not be able to simultaneously establish two WiFi connections, the coded protocol, concepts, systems, and techniques described herein allow the client-device (e.g., a mobile device) to seamlessly transfer a connection from the first WiFi network to the intermediate 3G (or 4G) network and then from the intermediate 3G (or 4G) network to the second WiFi network. In this manner, a data transfer session will be uninterrupted when a client-device moves from the first access point (i.e., the access point for the first WiFi network) to the second access point (i.e., the access point for the second WiFi network).

In accordance with a still further aspect of the concepts, systems, and techniques described herein, in a communication system in which a client-device cannot connect to a server simultaneously through first and second access points, a method for transferring an ongoing data session between the first and second access points includes establishing a first connection between the client-device and the server via the first access point, and establishing a second connection between the client-device and server via an intermediate access point wherein at a least one of the connections between the first and second access points is provided via a coded protocol.

With this particular arrangement, a communication system is provided in which a client device can connect to a server through first and second access points via an intermediate access point, wherein each of the first and second access points and intermediate access point are implemented with the same or different access technologies.

Once the second connection is established between the client-device and server via the intermediate access point, in one embodiment, the method further includes terminating the first connection through the first access point. The method can then further include establishing a third connection between the client-device and the server via a third access point. It should be appreciate that at least one of the connections between the second and third access points is provided via a coded protocol.

In one embodiment, the first access point, the second access point, and the intermediate access point each use one of WiFi access technology, Bluetooth access technology, 2G access technology, 3G access technology, and 4G access technology.

In accordance with a further aspect of the communication protocol concepts, systems, and techniques described herein, a method for transmitting a file between one or more servers and one or more clients includes (a) for M information packets, generating NM coded packets at one of the one or more servers, (b) delivering the NM coded packets from the server to one or more of the one or more clients, (c) in some embodiments, upon reception of some of the NM coded packets at the one or more clients providing feedback from the clients to one or more of the servers, (d) in embodiments where feedback is employed, based on the feedback from the clients, adjusting the parameters M and NM at the one or more servers, (e) adjusting the window of information packets to be employed and forming new coded packets at the one or more servers, and (f) delivering the new coded packets from the one or more servers to one or more of the clients.

With this particular arrangement, an efficient and flexible method for transmitting a file between one or more servers and one or more clients is provided. In one embodiment, the NM coded packets have a fixed packet size.

In accordance with a still further aspect of the concepts, systems, and techniques described herein, a method for transmitting original information between one or more sources and one or more destinations includes (a) for M information packets, generating NM coded packets at one of the one or more servers, wherein the M information packets represents all of the original information to be transmitted from at least one of the one or more sources to one or more of the one or more destinations, (b) delivering the NM coded packets from the server to one or more of the one or more clients, (c) in some embodiments, upon reception of some of the NM coded packets at the one or more clients providing feedback from the clients to one or more of the servers, (d) in embodiments where feedback is employed, based on the feedback from the clients, adjusting the parameters M and NM at the one or more servers, (e) adjusting the window of information packets to be employed and forming new coded packets at the one or more servers, and (f) delivering the new coded packets from the one or more servers to one or more of the clients.

With this particular arrangement, a transport protocol which facilitates the implementation of a multi-path transport protocol that can emulate current UDP interface (to higher and lower layers) and provide a more effective service is provided. By using network coding, it is possible to eliminate the need to track the identity of each packet, and, hence, it is possible to remove the coordination overhead associated with many conventional transport protocols. The proposed method takes advantage of multiple paths, interfaces, mediums, servers, and storage locations available in the network. This allows one to provide a service with tradeoffs in performance (e.g., rate, reliability, complexity, and delay) matched to application requirements. The proposed protocol allows quick response to congestion by load balancing over different network resources. The method also enables soft vertical hand-over across heterogeneous networks. This transport protocol can be tailored to meet the delay requirements of media streaming applications by coding within small subsets of data. Different coding strategies for subset delivery based on urgency level of each subset may also be used.

It should be appreciated that even though the concepts, systems, and techniques described are sometimes presented as a transport protocol, after reading the disclosure provided herein, it should be understood that the same concepts, systems, and techniques may also be implemented in other layers of a networking protocol suite including but not limited to an application layer, network layer, or link layer.

Thus, it should be understood that the coding techniques and control methods described herein are not limited to implementation in the transport layer of a network protocol stack. Moreover, depending upon the layer in which the method describe herein is implemented, the size of the data units (packets) and the time scale of the coding operations may vary. Nevertheless, concepts and advantages described herein such as soft vertical hand-off, dynamic load balancing, and ability to maintain multiple connections simultaneously across different interfaces with or without feedback still apply.

Implementing the techniques described herein in the application layer can be achieved by, for instance, establishing a CUDP connection across a SSH connection. All the coding operation and control algorithm are performed at the application layer on top of SSH. In this setup, the coding operation is performed in an end-to-end manner.

Another example involves coding at the link layer. Since the link layers manages each link individually, the coding operation implemented at the link layer is also on a per-link basis, and is no longer performed in an end-to-end manner. In some embodiments, coding is employed at intermediate nodes along a path. Again, this approach enables seamless connection and hand-over across multiple access technologies such as but not limited to WiFi, LTE, WiMax, and HSPA.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an attribute history as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an attribute level change history as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD- ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below. All examples and features mentioned below can be combined in any technically possible way.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4A is an example of a coded packet divided into two disjoint subsets B1 and B2.

FIG. 4B is an example of a transition strategy in which coded packets from one subset are sent across one sub-flow while coded packets from another subset are sent across another sub-flow.

FIG. 4C is an example of a transition strategy in which coded packets from each subset are sent across both sub-flows.

DETAILED DESCRIPTION

Figure 1:
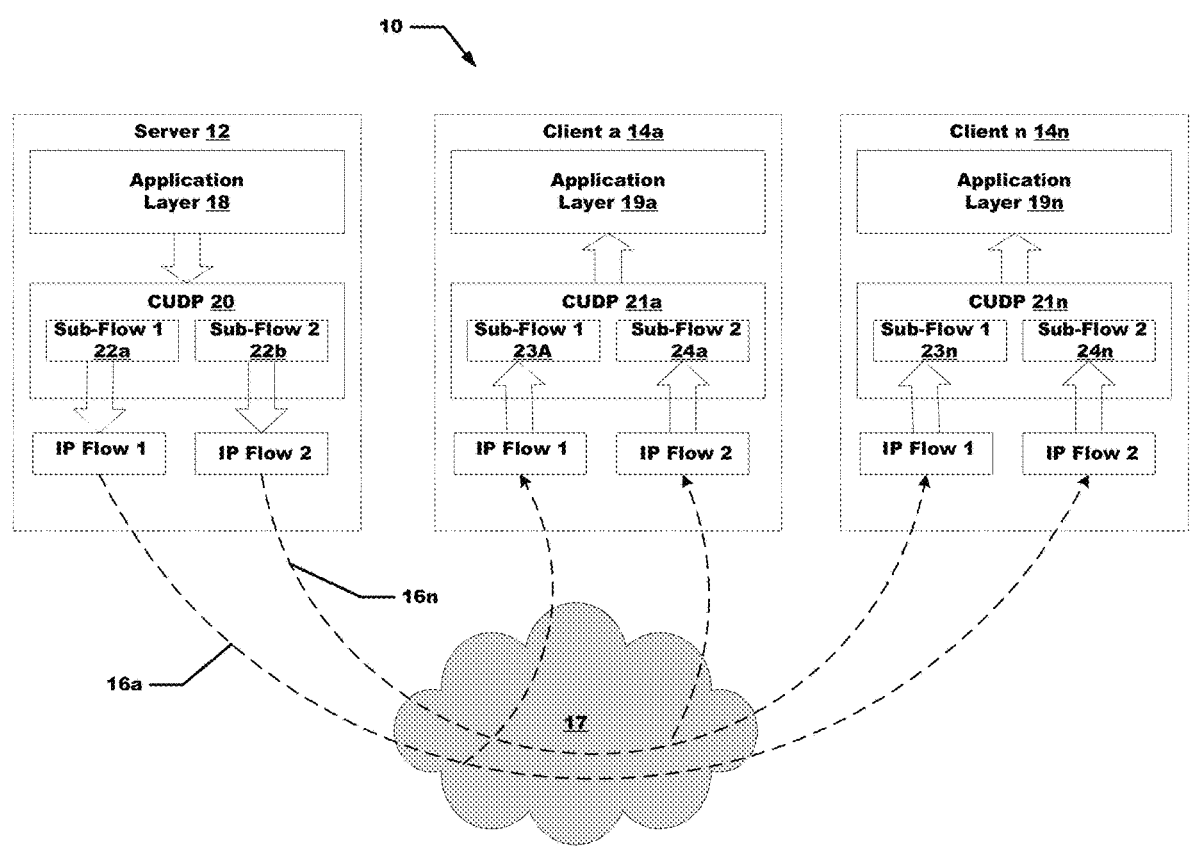
FIG. 1 is a block diagram of a coded user datagram protocol (CUDP) in a protocol stack for a single connection between a server and a client through one or more network paths/interfaces. The IP addresses of the CUDP sub flows can be the same or different.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Before describing a protocol and methods for improving communications performance through network coding, some introductory concepts and terminology are explained.

Reference is sometimes made herein to "data." As used herein, data can include any type of data, including but not limited to voice, image, and video. Thus, reference made herein to a "data session" is not limited to any particular data type.

It should be understood that reference is also sometimes made herein to implementation of a protocol on a specific network layer or layers including but not limited to: transport layers, link layers, and application layers. In one exemplary embodiment described herein, a so-called Coded User Datagram Protocol (CUDP) is described at the transport layer. Such reference is not intended as and should not be construed as limiting of the communication coded protocol concepts described herein. Rather, such references and examples are given merely to promote clarity in the description of the coded protocol concepts described herein.

Accordingly, it should be understood that the coding system and techniques and control methods described herein are not limited, for example, to implementation in a transport layer of a protocol stack. Rather, the proposed concepts and techniques may be implemented in other layers such as the physical layer, link layer, network layer, and application layer. Moreover, depending upon the layer in which the method described herein is implemented, the size of the data units (packets) and the time scale of the coding operations may vary. Nevertheless, concepts and advantages described herein such as soft vertical handoff, dynamic load balancing, and ability to maintain multiple connections simultaneously across different interfaces still apply.

It may be desirable, for example, to implement the coded protocol techniques described herein in an application layer when the access layer has no control over the network's transport layer or the network transport layer has desirable properties but does not support connections of the desired type. For example, connections established with the Secure Shell (SSH) network protocol offer cryptographic data security but do not support UDP connections. Implementing the coded communication protocol techniques described herein in the application layer can be achieved, for instance, by tunneling the traffic over an SSH connection. Such an embodiment combines the security benefits of SSH with the performance benefits of the coded communication protocol herein described. In such an embodiment, all coding operations and control techniques are performed at the application layer on top of SSH. In such an arrangement, the coding operation is performed in an end-to-end manner. The manner in which such an arrangement may be implemented will be understood by those of ordinary skill in the art.

Another example involving coding at the application layer can be implemented when one or more intermediate nodes is available in the network between the transmitter and the receiver or receivers. One example of such a scenario occurs when an application is streaming video over a network running TCP or one of its coded variations (e.g., CTCP or MPTCP/NC). In a network where video is being transported to a number of receivers that receive data through a network that includes one or more WiFi base stations as the transmitters in the last hop, running the application at the transmitter, receiver, and base station makes it possible to tunnel the coded communication protocol herein described through the TCP or coded TCP connection. In this case, a protocol without guaranteed reliability is being tunneled through a protocol that guarantees reliability. Use of this approach can avoid triggering the congestion control mechanisms of TCP and coded TCP (e.g., rate backoff) when losses occur in the last-hop link (e.g., the link from a WiFi access point to the client). It also allows the code to avoid the delay associated with retransmission. Packets are coded at the application layer and passed to the transport layer for transmission. In one embodiment, the intermediate node acknowledges each received packet as if it were the next desired packet according to the packet order; this acknowledgment is made even if the received packet is a distinct packet received out of order. The intermediate node then establishes a second connection with the end receiver. In some embodiments, this second connection is implemented with coded TCP. In some embodiments, this second connection is implemented with UDP, creating a mixed TCP/UDP connection from end to end across the network.

Another example involves coding at the link layer. Since the link layer manages each link individually, the coding operation implemented at the link layer is also on a per-link basis rather than an end-to-end basis. Again, one may achieve seamless connection and hand-over across multiple access technologies such as WiFi, LTE, WiMax, HSPA, etc. with a link layer implementation of the concepts described herein.

Determining on which layer to implement the coded communication protocol described herein depends upon a variety of factors including but not limited to delay constraints, hardware constraints, software constraints, which layers are accessible for changes/modifications, and ease of integration into an existing system. It should be understood that in any particular application, these factors may be weighted differently (i.e., some factors may be more important for one application and the same factors may be less important for another application). In any given application, one of ordinary skill in the art will understand how to evaluate such factors and select the particular layer or layers in which to implement the coded protocol described herein. Thus, it should be understood that in some applications it may be desirable to implement the coded protocol described herein in a physical layer or a link layer while in other applications it may be desirable to implement the coded protocol techniques in the transport layer or application layer.

Referring now to FIG. 1, a client-server system 10 includes a server 12 coupled to one or more clients 14a-14n through one or more paths 16a-16n, portions of which may include the Internet. Server 12 and clients 14a-14n each include application layers 18, 19a-19n, which operate in accordance with a coded user datagram protocol within a protocol stack (i.e., a software implementation of a computer network protocol suite) 20, 21a-21n, respectively. Thus FIG. 1 illustrates a coded user datagram protocol (CUDP) as the transport layer 20, 21a-21n for a single connection between a server 12 and a collection of clients 14a-14n. The IP address of the CUDP sub flows can be the same or different. As in known, individual protocols typically exist within a suite.

Consider now the following scenario of transmitting a single file from server 12 to clients 14a-14n. The CUDP protocol establishes multiple sub-flows, which can use possibly different ones of network paths 16a-16n.

For the given file, conventional multipath transmission control protocol (MPTCP) and coded transmission control protocol (MPTCP/NC) map each uncoded or coded byte or packet to a different sub flow in 22a-22n (e.g., as in the paths 16a-16n), and each sub-flow operates as a conventional Transmission Control Protocol on the assigned coded or uncoded bytes or packets. Feedback (e.g., feedback of acknowledgements from each receiver to the transmitter) is employed to ensure that transmissions do not cease until all data packets are received, either directly or in coded form, at all decoders.

In order to avoid the delay and network traffic associated with feedback, which be very large, for example, when the number of receivers is large, the network coding protocol as described below in conjunction with CUDP is used.

Each of the sub-flows of CUDP, whenever allowed to transmit, forms a linear combination of the packets within the file and hands this combination to the IP layer for delivery. The linear combination can be generated at random or deterministically. The subset of packets combined in each coded packet may be small or as large as the entire file. The size of the subset of packets combined in each linear combination and the number of linear combinations formed may affect the delay, decoding success probability, and decoding complexity at the receivers 14a-14n. A particularly efficient coding method is to form random linear combinations of small, non-overlapping subsets of packets. The linear coefficients may be chosen at random or deterministically. The number of coded packets formed for each subset may be matched to the probability of packet loss in the network.

It is important to ensure that CUDP's packet structure is compatible with the traditional TCP or UDP packet structure so that nodes within the network, such as current implementation of middle boxes and Network Address Translations (NATs) can be operated without modification. In one embodiment, the coefficients of the linear combination are embedded within the payload so that they can be used for decoding.

Figure 2A:
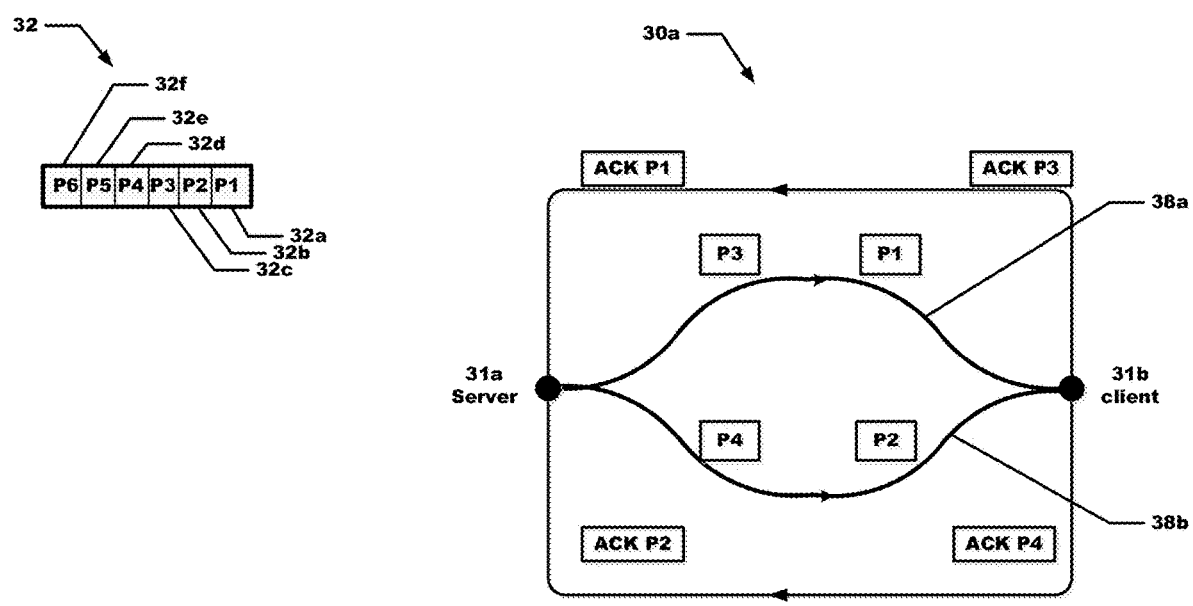
FIGS. 2A through 2D are an example of MCUDP sending coded packets through multiple paths.

Referring now to FIGS. 2A-2D a comparison of MPTCP, MPTCP/NC, CUDP, and MCUDP is shown for a network with a single receiver. In FIG. 2A, MPTCP divides even and odd numbered packets for transmission, i.e., P1, P3, and P5 are sent down a first path 38a and P2, P4, and P6 are sent down a different path 38b. In this implementation of MPTCP, which is consistent with the MPTCP architecture described in the IETF document http://tools.ietf.org/html/draft-ietf-mptcp-architecture-05#section-5.2, acknowledgements and re-transmissions are handled entirely at the sub-flow level; i.e., packets are acknowledged separately on each path, and acknowledgments are sent on each path only when the packets arrive in the order in which they were transmitted on that path. If a packet, for example, packet P3 is lost, then MPTCP must retransmit packet P3 on the same path through which it was originally scheduled to be transmitted. This risks delaying the entire transmission, to the rate of transmission on the slowest path (i.e., the bottleneck path).

Figure 2B:
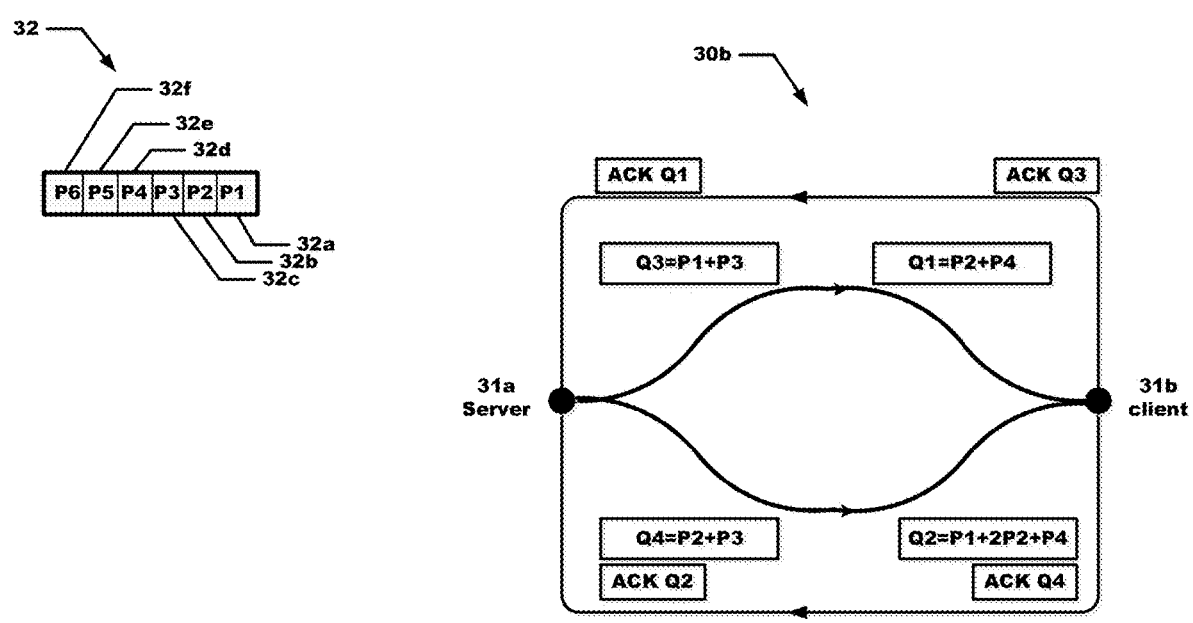

In FIG. 2B, MPTCP/NC forms a linear combination of the available packets 32a-32f, generally denoted 32. Which coded packets goes down each path is controlled centrally by a MPTCP/NC layer, which monitors all sub-flows. This layer produces random linear network coded packets from the original packets in its coding window and pushes those packets to sub-flows when those sub-flows are available to carry new packets. Each sub-flow creates R coded packets for each received packet; the coded packets are random linear combinations of all packets in the sub-flows coding window. These coded packets are sent up to the IP layer and transmitter over the network to the receiver. Each path handles acknowledgment of received packets independently. Received packets are then sent up to the MPTCP/NC layer. If packets are linearly independent of previously received packets, then a connection-level acknowledgment (DATA ACK) is sent to acknowledge the received packet. Eventually, the MPTCP/NC collects enough linearly independent packets to solve the linear system of equations and receiver all packets, which are then delivered to the application layer. Each packet that is linearly independent of the prior packets is referred to as a degree of freedom.

Figure 2C:
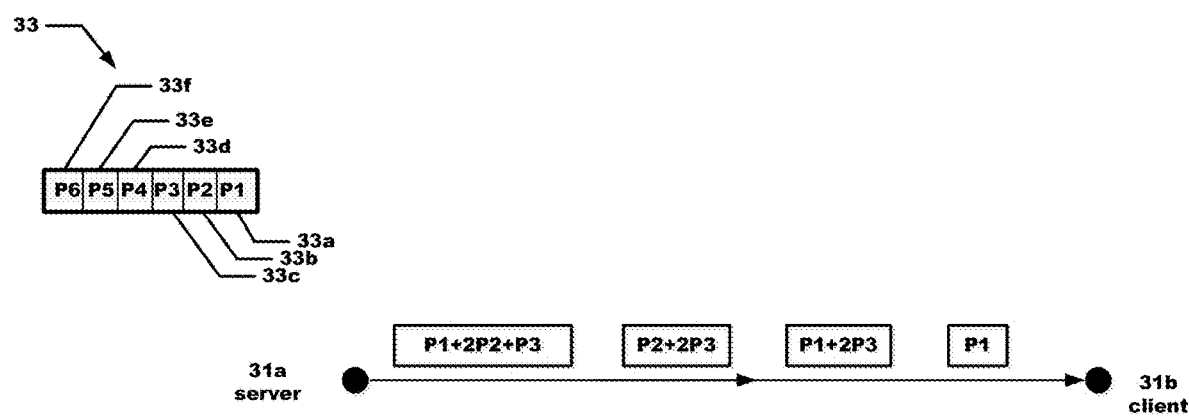

In FIG. 2C, CUDP forms random linear combinations of the available packets 33a-33f, generally denoted 33, and transmits them down the single path to the receiver. Each coded packet is a linear combination of at most k data packets, and Rk data packets are transmitted for each subset of k data packets. In some embodiments, parameters R and k are chosen using system parameters such as packet erasure probabilities, delay constraints, and decoder complexity constraints. In some embodiments, these parameters are changed as a function of knowledge about the network behavior or knowledge about the data type. In some embodiments, different portions of the same file are coded using different values of R and k. In some embodiments, these parameters are changed as a function of the priority of each piece of data. In some embodiments, priorities are designated by the application. In some embodiments, no acknowledgments are sent. In some embodiments, feedback is in determining parameters R and k.

Figure 2D:
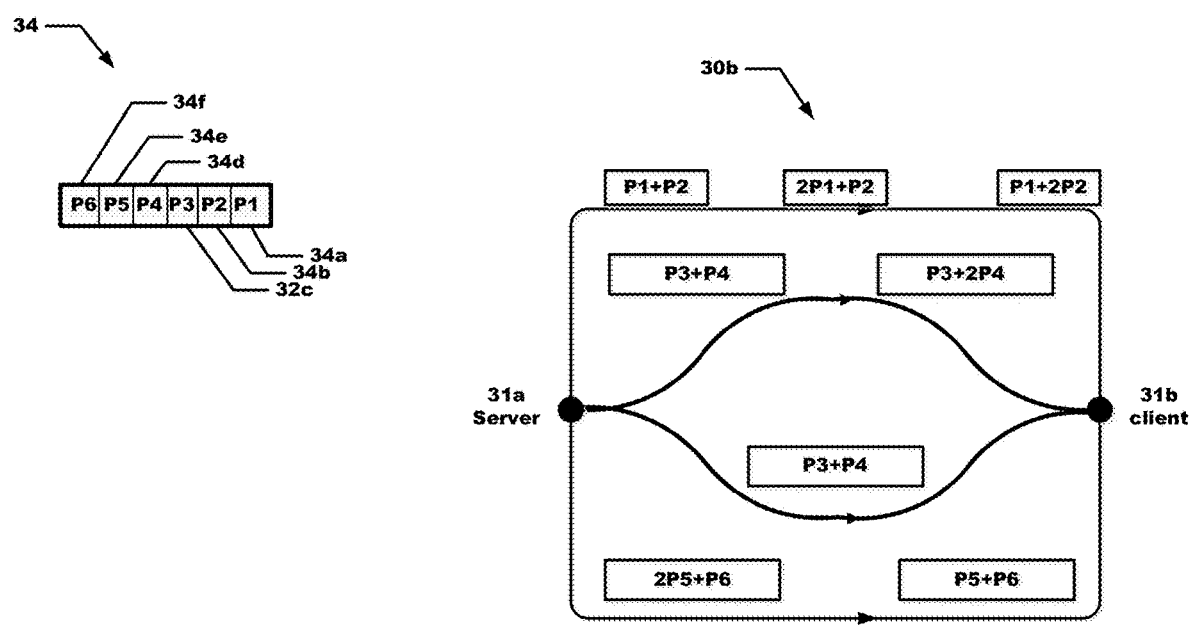

In FIG. 2D, MCUDP transmits random linear combinations of the available packets 34a34f, generally denoted 34, and transmits each down one of the available paths. In some embodiments, all linear combinations of a particular subset of k data packets are sent down the same path. In some embodiments, linear combinations of a particular subset of k data packets are sent down different paths. In some embodiments, no acknowledgments are sent. In some embodiments, the parameters R and k are determined by the performance along the paths going to the worst receiver. In some embodiments, the parameters R and k are designed to achieve the best possible expected performance with respect to the distribution on the paths to all receivers. The amount of redundancy should be sufficient to battle the losses in the network but small enough to avoid wasting network resources.

In contrast to the novel CUDP and MCUDP concepts, prior coded protocols use acknowledgments and transmission repeats to obtain reliability.

In order to obtain good performance without the use of individual packet acknowledgments, CUDP and MCUDP employ some redundancy in their description of each subset of packets. Each receiver decodes those subsets of packets for which it has received a sufficient number of coded descriptions to solve the collection of linear equations transmitted in the coded packets. For example, if k=4, R=5/4, and random coding is used, then the CUDP encoder transmits coded packets a11P1+a12P2+a13P3+a14P4, a21P1+a22P2+a23P3+a24P4, a31P1+a32P2+a33P3+a34P4, a41P1+a42P2+a43P3+a44P4, and a51P1+a52P2+a53P3+a54P4, where ai j, i∈{1, . . . , 5} and j∈{1, . . . , 4} are randomly chosen linear coefficients. Using this code, receive of any four linearly independent equations allows for solution of packets P1, P2, P3, and P4. Use of disjoint sub-sets of packets in coding may allow for reliable decoding of later packets even if an earlier subset of packets cannot be decoded. For example, describing packets P5, P6, P7, and P8, using coded packets a15P5+a16P6+a17P7+a18P8, a25P5+a26P6+a27P7+a28P8, a35P5+a36P6+a37P7+a38P8, a45P5+a46P6+a47P7+a48P8, and a55P5+a56P6+a57P7+a58P8 allows for reliable decoding of packets P5, P6, P7, and P8 using any 4 linearly independent received packets even if packets P1, P2, P3, and P4 could not be decoded reliably.

It should be noted that prior uncoded and coded protocols for multiple receivers generate high volumes of acknowledgment traffic when the number of receivers is large. With CUDP and MCUDP, this heavy traffic load and the high volume of repeated transmissions is avoided.

Figure 3:
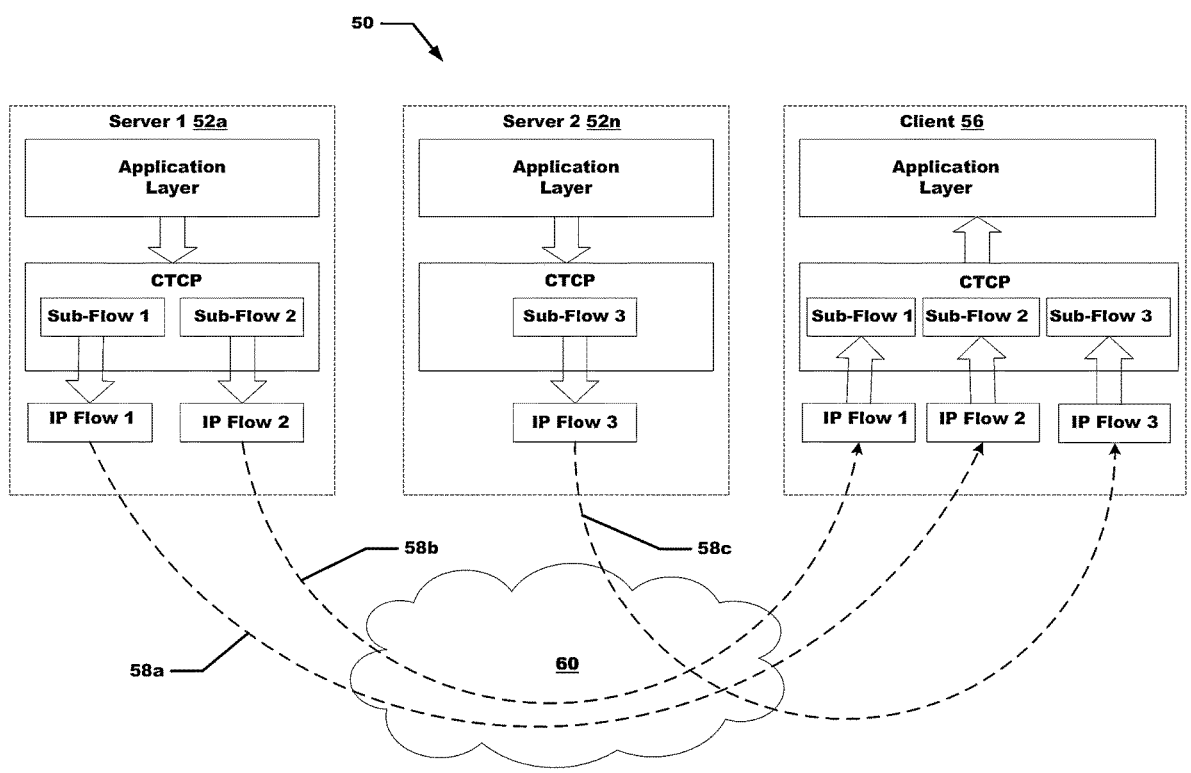
FIG. 3 is an example of CUDP with multiple servers.

Referring now to FIG. 3, a client-server system includes multiple servers 52a-52n generally denoted by S (here only two servers are shown for clarity) and at least one client 56 generally denoted by C. Servers S utilize one or more of multiple paths to couple to each of the one or more clients C. In the exemplary embodiment of FIG. 3, only three paths 58a-58c are shown although any number of paths may also be used. The servers S and clients C each include an application layer which operates via MCUDP. One of the main advantages of MCUDP is that it allows the receiver 56 to use multiple paths (e.g., paths 58a-58c) and/or multiple servers (e.g., servers 52a and 52b) simultaneously. This can be accomplished without feedback and without the servers coordinating with each other.

It should be appreciated that MPTCP, CTCP, and MPTCP/NC cannot achieve downloads without feedback. Thus MPTCP, CTCP, and MPTCP/NC do not scale the way MPUDP can.

When using MCUDP, each sub-glow (which can be on different servers) forms the coded packets independently; no rate coordination is required between the sub-flows. In some embodiments, limited feedback from the clients is used to control the rates at which each sub-flow generates coded packets. For example, a receiver that sends an acknowledgment (K, N) along a given sub-flow every time K coded packets are received on that sub-flow can adjust the rate along the sub-flow using both the number K of packets received from that sub-flow and the number N of packets received in total. Thus, the receiver can control the amount of redundancy introduced by the sub-flows and each server can adjust the rate at which it transmits along each sub-flow.

Another advantage of CUDP and MCUDP is that they can take advantage of distributed storage. Not only can CUDP and MCUDP use multiple servers, MCUDP clients can receive one or more data sources even if those files are scattered over the network. For example, instead of storing multiple copies of a particular file, for example a video file, in different devices across the network, coded partial copies of the file can be formed and stored at various locations (e.g., at some edge servers or close to cellular base stations). This method of distributed storage is resilient to storage failures, requires smaller space, and can be implemented even when feedback is unavailable or using feedback is undesirable.

In addition to using multiple servers and distributed storage, MCUDP can establish connections through different interfaces and media simultaneously. For example, consider a device with 3G, 4G, WiFi and Bluetooth interfaces. Different interfaces may be running the same or different protocols. Current implementations do not allow the device to use multiple interfaces at the same time. For instance, even if both 3G and WiFi are enabled on the device, the WiFi interface is active network interface for data communication, and the 3G interface acts as a backup to the WiFi connection. This restriction of the current implementations results primarily from the fact that it is difficult to coordinate transfer of packet across multiple paths/flows/interfaces. While some coded protocols such as CTCP and MPTCP/NC allow simultaneous use of multiple interfaces, they require that feedback be available on all interfaces and that all interfaces operate under TCP. On the other hand, MCUDP alleviates the need for feedback, and the need for coordination, allowing use of multiple interfaces simultaneously.

Some of the key benefits of CUPD and MCUDP are their simplicity and their resilience to network failures, even when feedback is unavailable and/or delay constraints are very tight. By taking advantage of small coding windows, limited redundancy, and multiple paths/flows/interfaces where available, CUDP and MCUDP are able to establish and maintain the connection even if part of the network fails or the delay constraints and packet losses prohibit perfect reconstruction.

In order for the receiver to decode a particular subset of packets, the receiver must collect enough coded packets to solve for the data packets. As a result, if R>1, the coding operation performed by CUDP incurs a higher delay in delivering data to the application than UDP. This delay however, has benefits in terms of the resilience of the code. Adding a small amount of redundancy increases the transmission rate only slightly while often allowing for perfect reconstruction even when a small fraction of the packets are lost. Further, this resiliency is experienced by all receivers even if each misses a different subset of the coded packet transmissions.

FIG. 4A illustrates a linear combination of coded packets 70 comprised of a plurality of individual coded packets, here twelve packets P1-P12 are shown. Coded packets P1-P12 are grouped into two disjoint subsets B1 and B2, 72a and 72b. FIGS. 4A-4C illustrate different coding strategies.

Referring now to FIG. 4B, an example of a transition strategy in which a source 74 sends coded packets from a first block B1 72a across one sub-flow and coded packets from a second block B2 72b across a second sub-flow is shown. The block sizes K1 and K2 and redundancy rates R1 and R2 for the two sub-flows may be the same or different.

FIG. 4C is an example of a transition strategy in which source 82 sends coded packets from a first block B1 72a across two sub-flows and coded packets from a second block B2 72b across two sub-flows. The number of coded packets sent on each sub-flow may be the same or different.

Referring now to FIGS. 4B-4C, server-side sub flows can make decisions regarding when and how to transition from one block to the next block.

FIGS. 4B-4C illustrate several different exemplary transmission strategies. The particular transmission strategy to use for any given application depends, at least in part, upon the urgency of the current block to the application. Different blocks can have different levels of urgency. These urgency levels can be signaled through and application programming interface (API) from the application layer or can be estimated using the communication history.

For instance, consider a scenario in which the data file contains two types of data with two different levels of urgency. One example is a data file containing video to be streamed real time and text describing programming information from the video provider. Delay constraints on each subsequent block of video are likely to be far tighter than delay constraints on text since delaying part of a streaming video can seriously degrade the user's experience. As discussed in conjunction with FIG. 4B, the server may choose to send these two different data types across different sub-flows. If information is available about the capacity and loss rate on each sub-flow, it is desirable to match the information and transmission parameters for each sub-flow to the corresponding capacity and loss rate. For example, if one sub-flow achieves high capacity with low loss rate and the other achieves lower capacity with low loss rate, then one may want to send the more urgent data along the low loss sub-flow using small blocks and the less urgent data along the high loss sub-flow using larger blocks. The redundancy level for each sub-flow should be chosen to balance the loss rate along that sub-flow and the urgency of the transmission. For example, if the rate on one sub-flow is 10%, then one may want to employ approximately 10% redundancy (R=1.1) on that sub-flow.

On the other hand, the server may choose to keep redundancy levels very low and block sizes very small in scenarios where it is better to drop the current block and move on to the next block than to incur the delay associated with a higher redundancy and/or block size.

Furthermore, the server may decide to send coded combinations of the same block over multiple sub-flows in order to use the maximal resources available for each block at any given time. In this case, each sub-flow may independently apply random linear coding.

An exemplary embodiment involves transmission of a data file or stream (e.g., a video or audio file or a live video or audio stream) from a single transmitter to so many receivers that the acknowledgment/retransmission strategy of TCP and other such reliable communication protocols are prohibitive. In this scenario, CUDP and MCUDP provide a level of reliability that can be matched to the ensemble of packet loss rates at the many receivers without the prohibitive overhead associated with acknowledgments and retransmissions. Limited feedback can be used to update the transmission rates, coding windows, and redundancy on the one or more paths to each receiver.

It should be appreciated that CUDP and MCUDP as described herein can be implemented such that they can completely replace the User Datagram Protocol (UDP) at a the transport layer without requiring any changes in the upper and/or lower layers. The application layer may access CUDP or MCUDP with the same API commands as it would use to access a TCP socket. Moreover, the CUDP packets may be structured such that they appear as UDP packets to the IP layer. This is particularly useful for compatibility with the current implementations of middle boxes (i.e., devices in the Internet that provide transport policy enforcement) and network address translators (NATs).

In addition, if any of the end-points are not capable of supporting CUDP or MCUDP, they can still establish a connection with a CUDPor MCUDP-enable device as a UDP session. This, in particular, can be achieved during the handshake phase. If at least one of the endpoints does not confirm that it can support CUDP or MCUDP, then the whole session can roll back to a regular UDP session.

Even with a single cellular network/device, there are multiple cellular access technologies, including, but not limited to, 2G, 3G, and 4G. Currently, once a device selects one of these technologies for data transfer, there is no mechanism for this device to switch to other technologies without interrupting the data transfer session. This can prevent efficient data transfer, especially when moving across coverage areas utilizing different access technologies. For example, 3G is currently more widespread than 4G, but 3G has a wider much slower speed. If a connection is started in an area where only 3G is available, when the device moves into an area with both 4G and 3G coverage, the speed of data transfer will not show any improvement. This is a result of the fact that the current network protocols cannot hand over the connection from a 3G to a 4G connection without interrupting the data transfer session. Likewise, if a connection is started in an area where 4G is available, the connection will be dropped immediately when the device moves out of the region where 4G is available and into a region where only 3G is available. The data transfer section has to be re-established to take advantage of a connection of a type different from the one on which it was started. Just as CTCP and MPTCP/NC resolve the above issue for TCP and MPTCP connections, the systems and techniques described herein resolve the above issues by establishing simultaneous connections across the different cellular technologies.

There are scenarios in which a device may not be able to connect simultaneously to two access points. This could, for example, be due to hardware constraints, such as would occur in a device having only one WiFi card, which thereby limits the device to be associated to a single WiFi access point at any given time. Such a limitation poses a challenge to achieving a soft-handoff between two access points.

Figure 5:
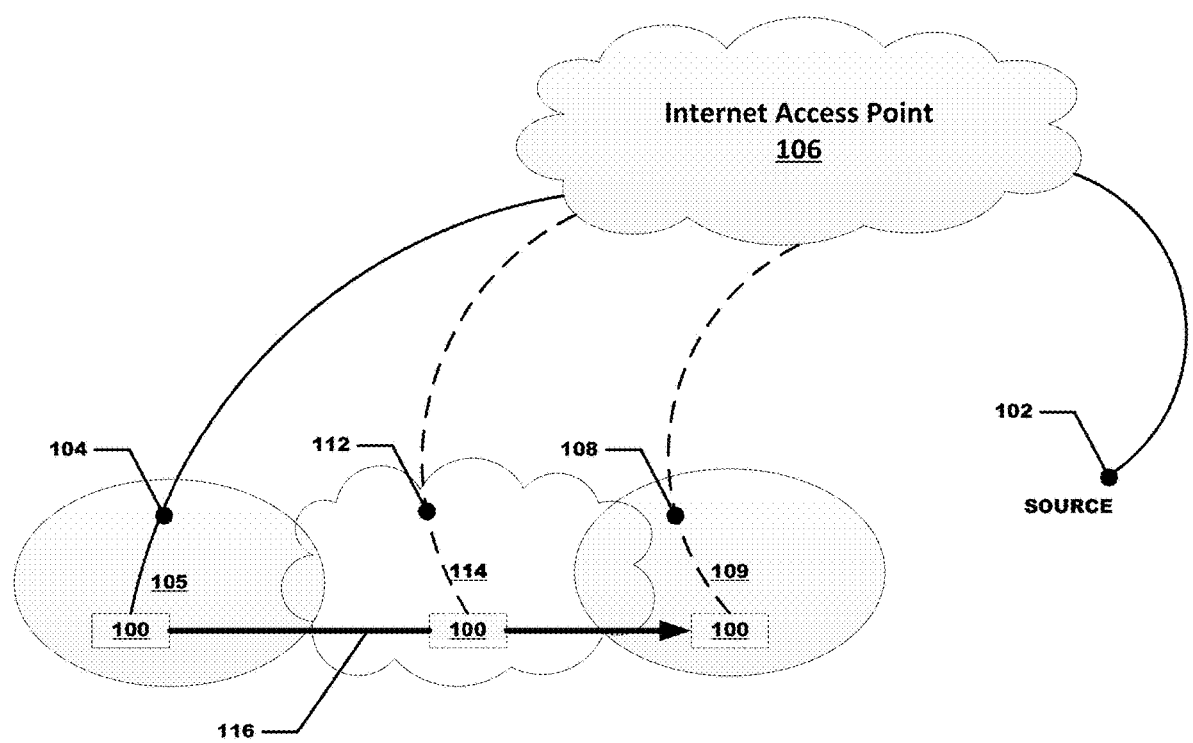
FIG. 5 is a block diagram of an exemplary system illustrating a hand-off between two access points using an intermediate access point.

To address such a challenge, and with reference now to FIG. 5, the coded communication protocol described herein can be used to implement a method of soft-handoff between two different available access points. In FIG. 5, it is assumed that client-device 100 communications with a source (e.g., a server) 102 through an access point 104. Access point 104 may, in turn, use the internet 106 to complete the path between client-device 100 and source 102. Client-device 100 may be, for example, any type of wireless networking device. Client-device 100 may be a hand held device, but it is not limited to hand-held devices.

In the exemplary embodiment of FIG. 5, first and second access points 104 and 108 are shown, as is an intermediate access point 112. Access points 104 and 108 provide respective coverage areas 105 and 109, and intermediate access point 112 provides a coverage area 114.

In the exemplary embodiment described in conjunction with FIG. 5, access points 104 and 108 are each provided as WiFi access points, and intermediate access point 112 uses 2G, 3G, or 4G access technology. It should be appreciated that in other embodiments access points 104 and 108 may be provided via Bluetooth or other access technologies. Thus, FIG. 5 illustrates an example where the two access points 104 and 108 are using a first access technology and a second access technology (here both illustrated as WiFi technologies) and intermediate access point 114 uses a different access technology (e.g., 2G, 3G, or 4G access technology).

Reference numeral 116 indicates a direction in which client-device 100 is not able to simultaneously establish two WiFi connections. Thus, as client-device 100 moves along path 116 from coverage area 105 to coverage area 114, any UDP data transfer session of client-device 100 will be interrupted as client-device 100 moves from the coverage area 105 provided by access point 104 to the coverage area 109 provided by access point 108.

Using the concepts, systems, and methods described herein, however, client-device 100 can seamlessly transfer the connection from the coverage area 105 provided by access point 104 to the coverage area 114 provided by the 3G access point 112 and then again from the coverage area 114 provided by the 3G access point 112 to the network coverage area 109 provided by access point 108. That is, client device 100 can seamless transfer the connection from the first WiFi network (i.e., WiFi 1) to 3G, and then from 3G to the second WiFi network (i.e., WiFi2). Hence, any data transfer session of client-device 100 will be uninterrupted as device 100 moves from WiFi1 to WiFi2 through a 3G networks. That is, client-device 100 can maintain uninterrupted service (e.g., an uninterrupted data session with server 102) as client-device 100 moves from WiFi1 to WiFi2.

Such seamless transfer of a data session between disparate networks can be accomplished using the coding algorithms and control methods described herein. Thus, in a communication system in which a client-device cannot connect to a server simultaneously through first and second access points and wherein each of the first and second access points are using first and second access technologies, a method for transferring an ongoing data session between the first and second access points includes establishing a first connection between the client-device 100 and the server 102 via the first access point 104. As the client-device 100 moves outside the coverage region 105 provided by the first access point 104, the client-device 100 establishes a second connection between the client-device 100 and server 102 via an intermediate access point 114. Intermediate access point 114 establishes a second connection between the client-device 100 and server 102 via an intermediate access point 112. Significantly, at least one of the connection via the first access point and the connection via the intermediate access point must be provided via a code protocol.

Once the second connection between the client-device 100 and the server 102 is established via intermediate access point 112, the first connection via the first access point 104 is terminated.

Next, once the first connection through the first access point 104 is terminated, client device 100 establishes a third connection between the client-device 100 and the server 102 via the second WiFi access point 108. Significantly, at least one of the connection via the intermediate access point 112 and the connection via the second WiFi access point 108 must be provided via a code protocol. Once the third connection between client-device 100 and server 102 is established via second WiFi access point 108, the second connection via the intermediate access point 112 is terminated.

As discussed above, the three access points can each use one of a plurality of different access technologies including but not limited to 2G, 3G, or 4G access technology, WiFi or Bluetooth access technologies, or EDGE/GPRS, EvDo, LTE, WiMax, HSPA technologies As noted above, the access technology used in the first access point and the access technology used in the intermediate access point are different access technologies. As noted above, in one embodiment, the coded protocol allows client-device 100 to transfer the connection from WiFi technology used at the first access point to one of 2G, 3G, or 4G technology used at the intermediate access point and then back to WiFi technology used at the second access point.

It should be appreciated that the coding algorithms and control methods described herein are not limited to implementation at any particular layer of the network protocol stack. For example, the disclosed method may be implemented in the physical layer, link layer, network layer, transport layer, and/or application layer. Depending upon the layer in which the coded protocol is implemented, the size of the data units (packets) and the time scale of the coding operations may vary. Nevertheless, features of the method, such as soft vertical hand-off, dynamic load balancing, the ability to maintain multiple connections simultaneously across different interfaces, the ability to operate even under limited or no feedback, and the robustness to some packet losses may be maintained regardless of the layer in which the coded protocol technique described herein is implemented.

Further embodiments include running a streaming, multiresolution, multiple description, or other code resilient to loss/unknown rate/variable rate or other type of communication performance uncertainty or degradation over a protocol (such as UDP) that does not guarantee reliable data delivery, fixed rate, fixed error probability, etc. Another embodiment involves using coding to partially (but not necessarily completely) improve the performance issues (loss, unknown rate, . . . ). Yet another embodiment includes tuning the level of coding, which may vary from none to high redundancy coding, to improve the performance for a streaming, multiresolution, multiple description, or other code. (This should include any code that can handle variable error rates, data rates, etc.), and further may include where improvement matches expected channel statistics for which code was built. Other embodiments include applying feedback to dynamically update the tuning and matching the data representation (e.g., MD code, MR code, . . . ) to the network coding.

The foregoing description has been directed to specific embodiments. It will be apparent, however, that variations and modifications may be made to the described embodiments, with attainment of some or all of their advantages. For example, it is expressly contemplated that certain components and/or elements described herein can be implemented other than as specifically shown. For example, even though the concepts, systems, and techniques described herein are presented as a transport protocol, after reading the disclosure provided herein, it should be understood after that the same methods may be implemented in the application layer when another transport protocol that is incompatible with UDP (e.g., SSH) is in place.

A flow chart of the presently disclosed method is depicted in FIG. 6. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 6A:
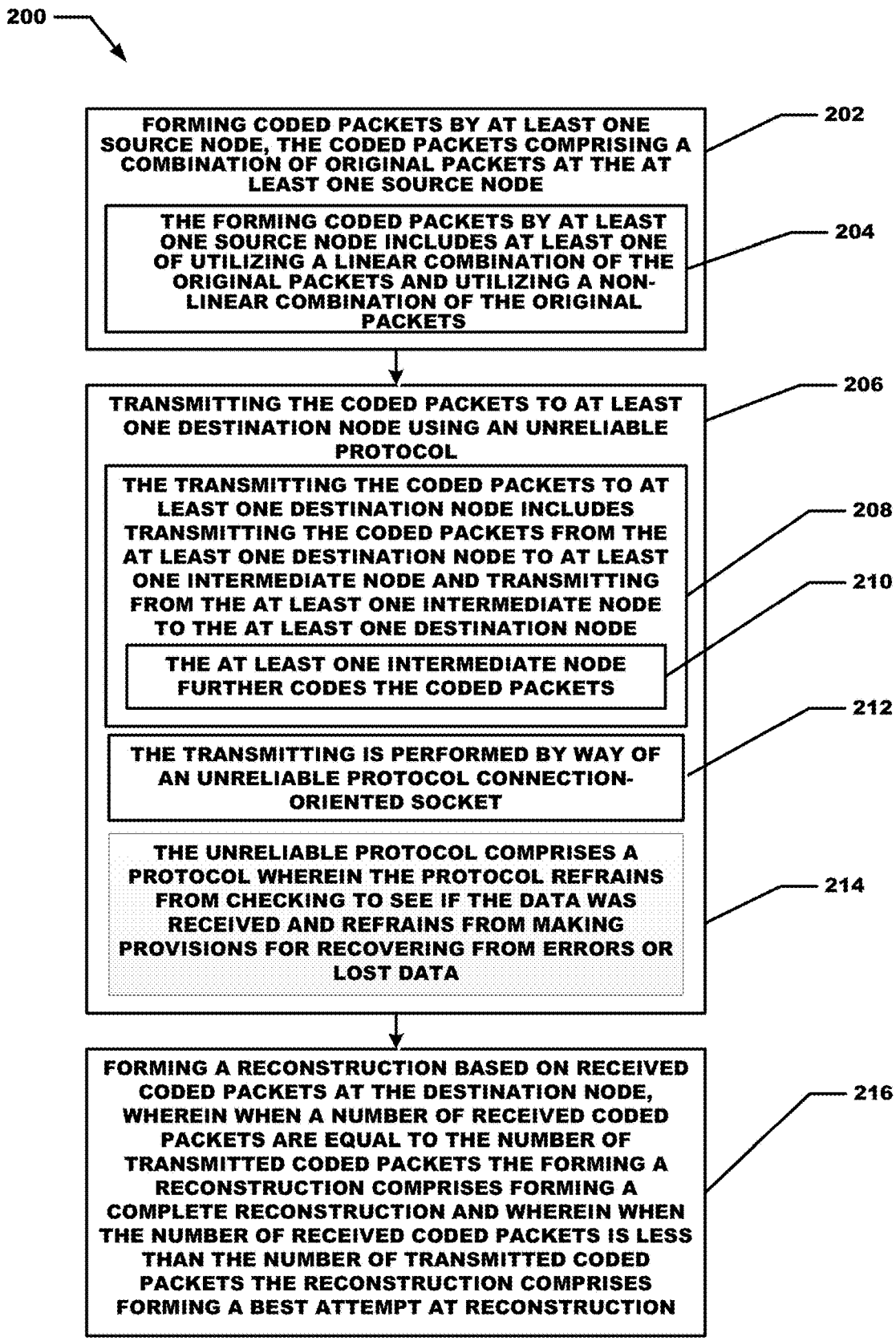
FIGS. 6A and 6B are a flow diagram of a particular embodiment of a method for improving communication performance through network coding.
Figure 6B:
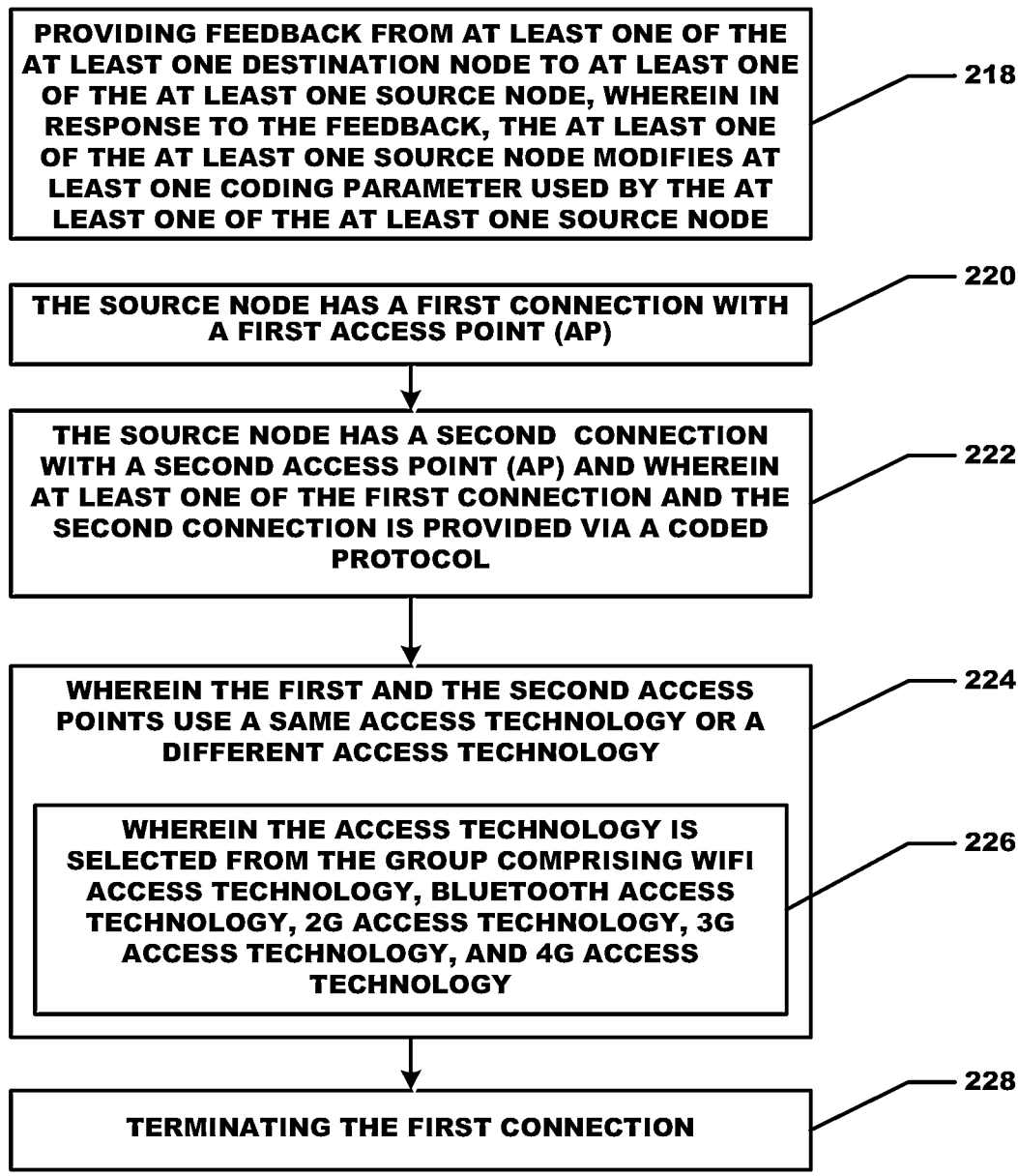

Referring now to FIGS. 6A and 6B, a particular embodiment 200 of a method for improving communication performance through network coding is shown. Method 200 begins with processing block 202 which discloses forming coded packets by at least one source node, the coded packets formed in accordance with at least one coding parameter, the coded packets comprising a combination of original packets at the at least one source node. As shown in processing block 204 the forming coded packets by at least one source node includes utilizing a linear combination of the original packets or the forming coded packets by at least one source node includes utilizing a non-linear combination of the original packets.

Processing block 206 states transmitting the coded packets to at least one destination node using an unreliable protocol. As indicated in processing block 208 the transmitting the coded packets to at least one destination node includes transmitting the coded packets from the at least one destination node to at least one intermediate node and transmitting from the at least one intermediate node to the at least one destination node. In certain embodiments, as shown in processing block 210, the at least one intermediate node further codes the coded packets.

Processing block 212 states the transmitting is performed by way of an unreliable protocol connection-oriented socket. Processing block 214 discloses wherein the unreliable protocol comprises a protocol wherein the protocol refrains from checking to see if the data was received and refrains from making provisions for recovering from errors or lost data.

Processing block 216 recites forming a reconstruction based on received coded packets at the destination node, wherein when a number of received coded packets are equal to the number of transmitted coded packets the forming a reconstruction comprises forming a complete reconstruction and wherein when the number of received coded packets is less than the number of transmitted coded packets the reconstruction comprises forming a best attempt at reconstruction Processing block 218 recites providing feedback from at least one of the at least one destination node to at least one of the at least one source node, wherein in response to the feedback, the at least one of the at least one source node modifies at least one of the at least one coding parameter used by the at least one of the at least one source node.

Processing continues with processing block 220 which discloses wherein the source node has a first connection with a first Access Point (AP). Processing block 222 states the source node has a second connection with a second Access Point (AP) and wherein at least one of the first connection and the second connection is provided via a coded protocol.

Processing block 224 recites wherein first and the second access points use a same access technology or a different access technology. As shown in processing block 226 the access technology is selected from the group comprising WiFi access technology, Bluetooth access technology, 2G access technology, 3G access technology, and 4G access technology.

Processing block 228 discloses terminating the first connection.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system is configured to perform operations comprising:
   forming a plurality of first network coded packets by a first source node, each of said first network coded packets comprising a combination of a number of first original packets at said first source node;
   forming a plurality of second network coded packets by a second source node, each of said second network coded packets comprising a combination of a number of second original packets at said second source node;
   treating the first original packets and the first network coded packets as error-free, transmitting said plurality of first network coded packets from the first source node to an intermediate node via a network;
   treating the second original packets and the second network coded packets as error-free, transmitting said plurality of second network coded packets from the second source node to the intermediate node via the network;
   forming a plurality of further network coded packets by further network coding said first network coded packets and said second network coded packets at the intermediate node, the further network coded packets comprising a combination of at least one of a number of the first network coded packets and a number of the second network coded packets; and
   treating the further network coded packets as error-free, transmitting said plurality of further network coded packets from the intermediate node to at least one destination node.

2. The method of claim 1 comprising receiving feedback from the at least one destination node, wherein the feedback indicates packet loss characteristics, and in response to the feedback, said first source node increasing the number of first original packets combined in each first network coded packet for transmission to said at least one destination node.

3. The method of claim 1 wherein forming the plurality of first network coded packets by the first source node includes at least one of utilizing a linear combination of said first original packets and utilizing a non-linear combination of said first original packets.

4. The method of claim 2 wherein said feedback from the at least one destination node includes at least one of a measure of end-to-end packet delay and a measure of packet loss.

5. The method of claim 1 further comprising:
wherein said source first node has a first connection with a first Access Point (AP);
wherein said first source node has a second connection with a second Access Point (AP) and wherein at least one of said first connection and said second connection is provided via a coded protocol.

6. The method of claim 5 further comprising terminating said first connection.

7. The method of claim 5 wherein first and said second access points use different access technologies.

8. The method of claim 7 wherein said access technologies are selected from the group comprising WiFi access technology, Bluetooth access technology, 2G access technology, 3G access technology, and 4G access technology.

9. The method of claim 1 comprising transmitting said plurality of further network coded packets to the at least one destination node using an unreliable protocol connection-oriented socket.

10. The method of claim 9 wherein said unreliable protocol comprises a protocol wherein said protocol refrains from checking to see if the data was received and refrains from making provisions for recovering from errors or lost data.

11. A non-transitory computer readable storage medium having computer readable code thereon for improving communication performance through network coding, the medium including instructions in which a computer system performs operations comprising:
forming a plurality of first network coded packets by a first source node, each of said first network coded packets comprising a combination of a number of first original packets at said first source node;
forming a plurality of second network coded packets by a second source node, each of said second network coded packets comprising a combination of a number of second original packets at said second source node;
treating the first original packets and the first network coded packets as error-free, transmitting said plurality of first network coded packets from the first source node to an intermediate node via a network;
treating the second original packets and the second network coded packets as error-free, transmitting said plurality of second network coded packets from the second source node to the intermediate node via the network;
forming a plurality of further network coded packets by further network coding said first network coded packets and said second network coded packets at the intermediate node, the further network coded packets comprising a combination of at least one of a number of the first network coded packets and a number of the second network coded packets; and
treating the further network coded packets as error-free, transmitting said plurality of further network coded packets from the intermediate node to at least one destination node.

12. The computer readable storage medium of claim 11 comprising receiving feedback from the at least one destination node, wherein the feedback indicates at least one of end-to-end delay and packet loss rate, and in response to the feedback, said first source node increasing the number of first original packets combined in each first network coded packet for transmission to said at least one destination node.

13. The computer readable storage medium of claim 12 wherein said feedback from the at least one destination node includes packet loss characteristics.

14. The computer readable storage medium of claim 12 wherein said unreliable protocol comprises a protocol wherein said protocol refrains from checking to see if the data was received and refrains from making provisions for recovering from errors or lost data.

15. The computer readable storage medium of claim 11 wherein said forming a plurality of first network coded packets by the first source node includes at least one of utilizing a linear combination of said first original packets and utilizing a non-linear combination of said first original packets.

16. The computer readable storage medium of claim 11 further comprising:
wherein said first source node has a first connection with a first Access Point (AP);
wherein said first source node has a second connection with a second Access Point (AP) and wherein at least one of said first connection and said second connection is provided via a coded protocol.

17. The computer readable storage medium of claim 16 further comprising terminating said first connection.

18. The computer readable storage medium of claim 16 wherein first and said second access points use different access technologies.

19. The computer readable storage medium of claim 18 wherein said access technologies are selected from the group comprising WiFi access technology, Bluetooth access technology, 2G access technology, 3G access technology, and 4G access technology.

20. The computer readable medium of claim 11 comprising transmitting said first network coded packets to the at least one destination node by way of an unreliable protocol connection-oriented socket.

21. A computer-implemented method in which a computer system is configured to perform operations comprising:
receiving a plurality of first network coded packets, each of said first network coded packets comprising a combination of a plurality of first original packets, wherein the first original packets and the first network coded packets are treated as error-free;
receiving a plurality of second network coded packets, each of said second network coded packets comprising a combination of a plurality of second original packets, wherein the second original packets and the second network coded packets are treated as error-free;
forming a plurality of further network coded packets by further network coding said plurality of first network coded packets and said plurality of second network coded packets, the further network coded packets comprising a combination of at least one of a number of the first network coded packets and a number of the second network coded packets;
treating the further network coded packets as error-free; and
transmitting said plurality of further network coded packets.

22. An apparatus comprising:
a memory;
a processor;
a communications interface;

an interconnection mechanism coupling the memory, the processor and the communications interface; and wherein the memory is encoded with an application that when performed on the processor, provides a process for processing information, the process configured for causing the apparatus to perform the operations of:

receiving a plurality of first network coded packets, each of said first network coded packets comprising a combination of a plurality of first original packets, wherein the first original packets and the first network coded packets are treated as error-free;

receiving a plurality of second network coded packets, each of said second network coded packets comprising a combination of a plurality of second original packets, wherein the second original packets and the second network coded packets are treated as error-free;

forming a plurality of further network coded packets by further network coding said plurality of first network coded packets and said plurality of second network coded packets, the further network coded packets comprising a combination of at least one of a number of the first network coded packets and a number of the second network coded packets;

treating the further network coded packets as error-free; and transmitting said plurality of further network coded packets.

* * * * *